Oct. 8, 1940.　　L. W. ATCHISON ET AL　　2,217,608
FAN AND ORIFICE ASSEMBLY
Filed Oct. 27, 1938

Inventors:
Leonard W. Atchison;
James L. Fletcher,
by Harry E. Dunham
Their Attorney.

Patented Oct. 8, 1940

2,217,608

UNITED STATES PATENT OFFICE 2,217,608

FAN AND ORIFICE ASSEMBLY

Leonard W. Atchison and James L. Fletcher, Schenectady, N. Y., assignors to General Electric Company, a corporation of New York Application October 27, 1938, Serial No. 237,240

1 Claim. (Cl. 230—120)

The present invention relates to fluid flow apparatus, and in particular to apparatus having a fan for discharging air from a duct through an orifice of reduced section or area compared to the area of the duct.

The object of our invention is to provide an improved construction and arrangement in fluid flow apparatus of this type.

Figure 1:
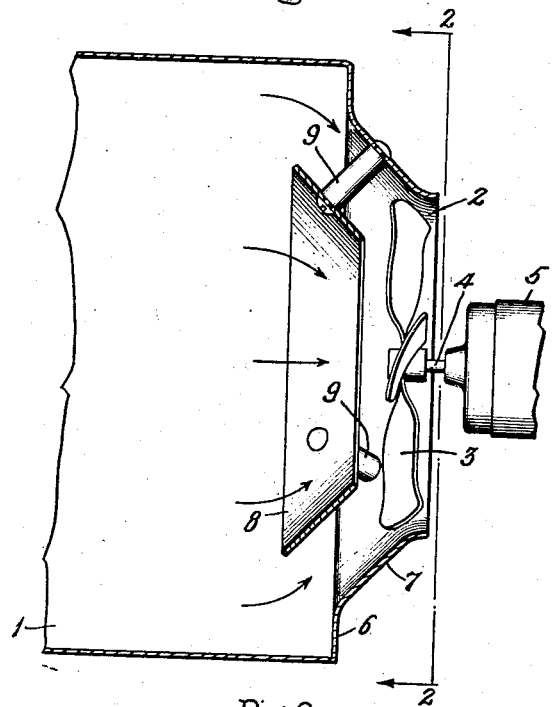
Figure 2:
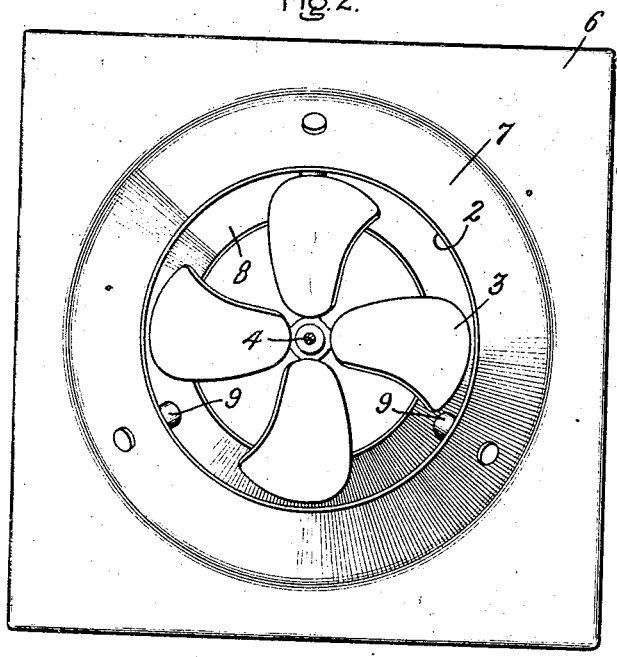

In the accompanying drawing, Fig. 1 is a sectional elevation of fluid flow apparatus embodying our invention, and Fig. 2 is a sectional view taken on line 2—2 of Fig. 1.

Referring to the drawing, there is shown a duct 1 of square or rectangular section having a discharge orifice 2 of reduced section at one end within which is located an electric fan 3 mounted on and driven by the shaft 4 of an electric motor 5 beyond the duct as regards the direction of air flow. The portion of the duct around the orifice is closed by end walls 6 having an annular tapered portion 7 converging toward the orifice. On the intake side of the fan is an annular baffle 8 supported from the walls 7 by supports 9. The walls providing the baffle 8 are tapered so as to be substantially parallel to the walls 7 and provide therebetween an annular passage from the duct converging toward the outer portions of the fan blades. This passage guides the air to the outer portion of the fan blades. The air acted upon by the central portion of the fan blades passes through the center of the baffle 8. The flow of air is indicated by arrows in Fig. 1.

The inner edges of the baffle 8 are within the rectangular portion of the duct at the rear of the walls 7 as regards the direction of air flow so that the air entering the annular passage is taken from a region in which the air is relatively quiet. Since the baffle extends closely adjacent to the intake edges of the fan, interference between the air streams flowing through the annular passage and the air streams flowing through the center of the baffle is minimized with a resultant decrease in the turbulence of the air on the intake side of the fan and a decrease in noise. Turbulence on the intake side of the fan tends to cause pulsations in the air discharged from the fan producing an objectionable pulsating noise.

The baffle 8 is most useful in constructions such as illustrated wherein the air is moved from a duct or casing through an orifice of smaller or reduced area. It is also useful in locations where the path of the air entering the fan is such that turbulence is produced on the intake side of the fan. From this aspect, the baffle 8 improves the entrance conditions of the fan by decreasing the turbulence of the air entering the fan.

What we claim as new and desire to secure by Letters Patent of the United States is:

In combination, a duct, a bladed fan, walls around the fan flaring inward from the duct walls to provide a discharge orifice for the duct of reduced section, driving means for the fan beyond the duct as regards the direction of air flow, and walls on the intake side of the fan substantially parallel to said flaring walls and at the rear of said flaring walls as regards the direction of air flow and extending closely adjacent the intake edges of the fan and cooperating with said flaring walls to provide an outer annular intake passage from the duct converging toward the outer portions of the fan blades and to provide an inner passage from the duct to the central portion of the fan blades.

LEONARD W. ATCHISON.
JAMES L. FLETCHER.